United States Patent
Iwase et al.

(10) Patent No.: US 8,864,140 B2
(45) Date of Patent: Oct. 21, 2014

(54) SEALING STRUCTURE USING A LIQUID GASKET

(75) Inventors: Yuji Iwase, Mishima (JP); Hiroshi Hata, Nagoya (JP); Yuji Yasuda, Nishikamo-gun (JP); Toshihiro Hirao, Suntou-gun (JP); Yoshiteru Hagino, Susono (JP); Katsuya Sasaki, Susono (JP); Isao Sato, Nagoya (JP); Sohei Murata, Chiryu (JP); Masahiro Kojima, Okazaki (JP); Masataka Kitte, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1095 days.

(21) Appl. No.: 12/861,483

(22) Filed: Aug. 23, 2010

(65) Prior Publication Data

US 2011/0049814 A1 Mar. 3, 2011

(30) Foreign Application Priority Data

Aug. 25, 2009 (JP) .................................. 2009-194808

(51) Int. Cl.
*F02F 11/00* (2006.01)
*F16J 15/14* (2006.01)
(52) U.S. Cl.
CPC ...................................... *F16J 15/14* (2013.01)
USPC ....................................................... 277/592

(58) Field of Classification Search
USPC .......................................... 277/592, 593, 944
See application file for complete search history.

(56) References Cited

U.S. PATENT DOCUMENTS

| 5,727,791 A | * | 3/1998 | Weiss et al. | ................... | 277/592 |
| 6,056,296 A | * | 5/2000 | Ii | .................................. | 277/595 |

FOREIGN PATENT DOCUMENTS

| CN | 2057979 U | 6/1990 |
| JP | A-62-194074 | 8/1987 |
| JP | A-10-299870 | 11/1998 |
| JP | A-11-37298 | 2/1999 |

\* cited by examiner

*Primary Examiner* — Gilbert Lee
(74) *Attorney, Agent, or Firm* — Oliff PLC

(57) ABSTRACT

A sealing structure using a liquid gasket, having a liquid gasket interposed in the form of a thin film between mating surfaces of a first member and a second member, thereby preventing the movement of oil via the mating surfaces, the sealing structure, includes at oil-side end portions of the mating surfaces, a gasket lump portion that is formed of an excess of the thin-film liquid gasket squeezed out from the mating surfaces, and an oil-shielding portion that covers a boundary portion where the gasket lump portion and the first member come into contact, thereby preventing a flow of the oil from directly striking the boundary portion, and is provided on an oil-flow upstream side from the boundary portion.

2 Claims, 8 Drawing Sheets

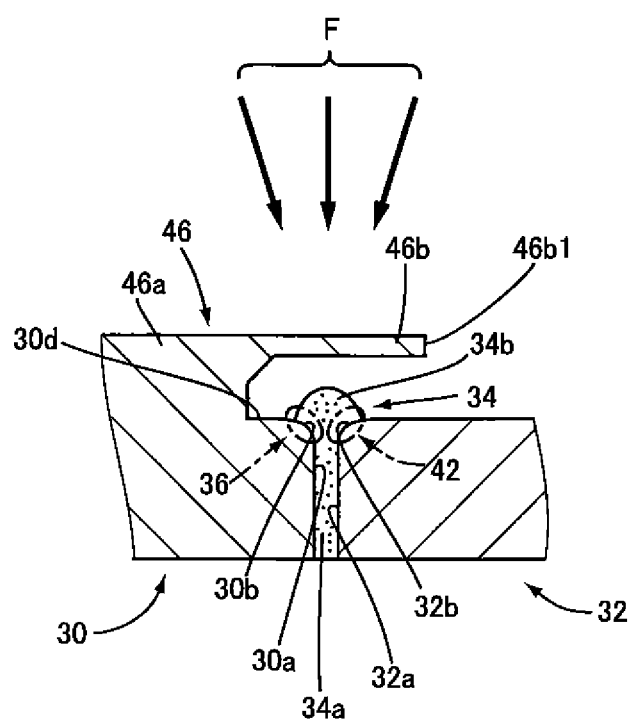

SEALING STRUCTURE USING A LIQUID GASKET

The disclosure of Japanese Patent Application No. 2009-194808 filed on Aug. 25, 2009 including the specification, drawings and abstract is incorporated herein by reference in its entirety.

BACKGROUND OF THE INVENTION

1. Technical Field

The present invention relates to a sealing structure using a liquid gasket that is interposed in the form of a thin film between the mating surfaces of a first member and a second member.

2. Description of the Related Art

There exists a well-known sealing structure using a liquid gasket, in which a liquid gasket, such as a silicone-based or acryl-based resin, is interposed in the form of a thin film between the mating surfaces of a first member and a second member, thereby preventing the movement (leakage) of oil via the mating surfaces. A well-known example thereof is the following sealing structure. Specifically, a liquid gasket (for example, Formed In Place Gasket (FIPG)) is applied to the mating surfaces of a case body and a case cover which constitute a case of a power transmitting device for vehicles, or the like. Subsequently, before the liquid gasket cures, both members are assembled so that the liquid gasket is thinly sandwiched between the mating surfaces, thereby preventing oil leakage out of the case. JP-A-62-194074 (Patent Document 1) shows an example of such a sealing structure.

In general, a liquid gasket used as above absorbs moisture in air or moisture in oil, for example, thus cures, and adheres to each member, thereby securing sealing performance (leakage resistance performance) against oil. Therefore, as shown in FIGS. 9A and 9B, for example, as a liquid gasket 5, a gasket thin film portion 5a is interposed between mating surfaces 3 and 4 of a first member 1 and a second member 2 respectively. Also, at oil-side end portions 6 and 7 of the mating surfaces 3 and 4 respectively, a gasket lump portion 5b is formed of the excess squeezed out from the mating surfaces 3 and 4, in such a manner the gasket lump portion 5b is continuous to the gasket thin film portion 5a. As a result of the formation of the liquid gasket 5 in this manner, the liquid gasket 5 will be positively brought into contact with air or oil at the gasket lump portion 5b, whereby the curing (adhesion) of the liquid gasket 5 is accelerated. This provides a sealing structure using the liquid gasket 5, which secures sealing performance.

SUMMARY OF THE INVENTION

Incidentally, in the case where oil is hermetically sealed in a case, such as a case of a power transmitting device for a vehicle, a flow of oil will occasionally occur within the case when a gear or the like placed in the case is rotated, or when the oil is swept up by the rotation of a predetermined gear for the purpose of lubricating gears, bearings, or the like in the case. Such an oil flow may directly strike (that is, directly hit) the interface (adherend) between a liquid gasket and a member. For example, as shown in FIGS. 9A and 9B, the oil flow F may directly strike an interface 8 between the liquid gasket 5 (gasket lump portion 5b) and the first member 1. This possibly allows the oil to enter into the interface 8, reducing the sealing performance. Such a phenomenon will be more remarkable when a stronger oil flow directly strikes the interface 8, and also when the liquid gasket 5 has not sufficiently cured. For example, as shown in FIG. 9B, when the structure has the mating surface 3 of the first member 1 protruding toward the oil side beyond the second member 2, a portion equivalent to the end portion 6 of FIG. 9A is not formed. Further, on the first member 1 side, a gasket lump portion 5b is formed on one continuous plane, whereby the interface 8 is substantially parallel to the oil flow F. This makes it easier for a strong oil flow F to directly hit the interface 8, and the oil thus may easily enter into the interface 8, reducing the sealing performance. Further, in a completion test of the production of a power transmitting device for a vehicle, for example; oil is actually poured and a gear is rotated, if the test is conducted where the liquid gasket 5 has not sufficiently cured, then the oil even more easily enters into the interface 8 especially in the state as shown in FIG. 9B. As a result, subsequent adhesion of the liquid gasket 5 thereto will be difficult, causing remarkable reduction in sealing performance.

To overcome the above problems, a possible measure is to hermetically seal the surrounding portion of the interface 8 to avoid contact with oil, and thereby to prevent the entry of the oil into the interface 8 before curing. However, by the property of the liquid gasket 5, the hermetically sealed state results in more time required to complete curing. Accordingly, there is a possibility that the relative position between the members 1 and 2 is changed due to the application of an external force to the case or the like, for example, before curing is sufficiently achieved. In such a case, desired sealing performance cannot be obtained. To deal with such a problem, a larger hermetically sealed space may be provided to create an air layer around the gasket lump portion 5b, so that the gasket 5 is positively brought into contact with air, thereby accelerating curing. For example, a technique of Patent Document 1 may be regarded as providing such a hermetically sealed state. However, due to the structural or space limitations on the case or the like, it is sometimes impossible to crease a hermetically sealed state or to provide an air layer. Further, when the mating surfaces of members, where a problem often occurs, are located in a lower part of the case (for example, a place where oil collects), providing of an air layer may be impossible. Thus, there has been no idea proposed about forming a gasket lump portion 5b to positively make contact with air or oil, and, minimizing the entry of oil into the interface 8 due to an oil flow F, without hermetically sealing the surrounding portion of the interface 8.

The invention was accomplished against the above background. An object thereof is to provide a sealing structure using a liquid gasket, which is capable of, without hermetically sealing the interface portion between the liquid gasket and each member, minimizing the entry of oil into the interface due to the oil flow.

The object indicated above may be achieved according to a first mode of the invention, which provides (a) a sealing structure using a liquid gasket, having a liquid gasket interposed in the form of a thin film between mating surfaces of a first member and a second member, thereby preventing the movement of oil via the mating surfaces, the sealing structure includes (b) at oil-side end portions of the mating surfaces, a gasket lump portion that is formed of an excess of the thin-film liquid gasket squeezed out from the mating surfaces, and (c) an oil-shielding portion that covers a boundary portion where the gasket lump portion and the first member come into contact, thereby preventing a flow of the oil from directly striking the boundary portion, and is provided on an oil-flow upstream side from the boundary portion.

According to the first mode of the invention, the sealing structure includes at oil-side end portions of the mating surfaces, a gasket lump portion that is formed of an excess of the thin-film liquid gasket squeezed out from the mating surfaces, and an oil-shielding portion that covers a boundary portion where the gasket lump portion and the first member come into contact, thereby preventing a flow of the oil from directly striking the boundary portion, and is provided on an oil-flow upstream side from the boundary portion. This therefore provides a sealing structure using a liquid gasket, in which a gasket lump portion for positively making contact with air or oil is formed so as to accelerate curing, and, without hermetically sealing the boundary portion (interface portion) between the liquid gasket and each member, the entry of oil into the interface due to the oil flow is minimized. Accordingly, for example, when the liquid gasket has not sufficiently cured, the entry of oil into the boundary portion due to the oil flow is minimized, securing sufficient sealing performance. Further, for example, also after the liquid gasket sufficiently cures, the entry of oil into the boundary portion due to the oil flow is minimized, maintaining the sufficient sealing performance. Moreover, because a hermetically sealed state is not formed, an air layer for accelerating the curing of a liquid gasket is not required. Accordingly, for example, disposition of the liquid gasket at the bottom, where oil constantly collects, is also possible. In addition, since there is no need to provide a space for forming a hermetically sealed state, space saving is also achieved.

Preferably, the first member has a predetermined protrusion having a protruding surface that extends in a direction parallel to the mating surface of the first member and does not faces the mating surface of the second member, and protruding toward the oil side from a wall surface that intersects the mating surface of the first member, and the oil-shielding portion is formed by a slot being formed in the protruding surface at a portion adjoining the mating surface of the first member, so that the slot receives a part of the gasket lump portion. As a result, with respect to the oil-shielding portion that covers the boundary portion where the gasket lump portion and the first member come into contact, thereby preventing the oil flow from directly striking the boundary portion, such an oil-shielding portion is appropriately provided on the oil-flow upstream side from the boundary portion. Specifically, a slot that prevents the mating surface and the projecting surface of the first member from having one continuous surface is formed, and a part of the gasket lump portion is received in the slot. This makes it less likely that the boundary portion between the liquid gasket (gasket lump portion) and the first member will be substantially parallel to the oil flow. Accordingly, for example, a strong oil flow is less likely to directly hit the boundary portion, whereby the entry of oil into the boundary portion due to the oil flow is minimized.

Preferably, the oil-shielding portion is a first direct-hit-avoiding plate that has a roof-like shape to cover the gasket lump portion, stands in the vicinity of the oil-side end portion of the mating surface of the first member, and is fixed to an oil-side wall surface of the first member, the oil-side wall surface intersecting the mating surface. As a result, with respect to the oil-shielding portion that covers the boundary portion where the gasket lump portion and the first member come into contact, thereby preventing the oil flow from directly striking the boundary portion, such an oil-shielding portion is appropriately provided on the oil-flow upstream side from the boundary portion.

Preferably, the oil-shielding portion further includes a second direct-hit-avoiding plate that has a roof-like shape to cover the gasket lump portion, stands in the vicinity of the oil-side end portion of the mating surface of the second member, and is fixed to an oil-side wall surface of the second member, the oil-side wall surface intersecting the mating surface, and the first direct-hit-avoiding plate and the second direct-hit-avoiding plate are disposed in such a manner that the mutually facing end portions thereof are into contact with each other. As a result, with respect to the oil-shielding portion that covers the boundary portion where the gasket lump portion and the first member come into contact, thereby preventing the oil flow from directly striking the boundary portion, and also covers the boundary portion where the gasket lump portion and the second member come into contact, thereby preventing the oil flow from directly striking the boundary portion, such an oil-shielding portion is appropriately provided on the oil-flow upstream side from the boundary portion.

Preferably, the oil-shielding portion is a first protruding portion that has a roof-like shape to cover the gasket lump portion and is formed on an oil-side wall surface of the first member, the oil-side wall surface intersecting the mating surface of the first member. As a result, with respect to the oil-shielding portion that covers the boundary portion where the gasket lump portion and the first member come into contact, thereby preventing the oil flow from directly striking the boundary portion, such an oil-shielding portion is appropriately provided on the oil-flow upstream side from the boundary portion.

Preferably, the oil-shielding portion further includes a second protruding portion that has a roof-like shape to cover the gasket lump portion and is formed on an oil-side wall surface of the second member, the oil-side wall surface intersecting the mating surface, and the first protruding portion and the second protruding portion are formed in such a manner that the mutually facing end portions thereof are in contact with each other. As a result, with respect to the oil-shielding portion that covers the boundary portion where the gasket lump portion and the first member come into contact, thereby preventing the oil flow from directly striking the boundary portion, and also covers the boundary portion where the gasket lump portion and the second member come into contact, thereby preventing the oil flow from directly striking the boundary portion, such an oil-shielding portion is appropriately provided on the oil-flow upstream side from the boundary portion.

Preferably, the first member and the second member form a case of a power transmitting device for vehicles, and the flow of the oil is an oil flow generated in the case by the rotation of a specific gear in the case forming the power transmitting device for vehicles. As a result, in a case of a power transmitting device for vehicles, a gasket lump portion for positively making contact with air or oil is formed so as to accelerate curing, and, without hermetically sealing the boundary portion (interface portion) between the liquid gasket and each member, the entry of oil into the boundary portion due to the oil flow in the case generated by the rotation of a specific gear is minimized. Accordingly, for example, when the liquid gasket has not sufficiently cured in a completion test of a power transmitting device for vehicles, the entry of oil into the boundary portion due to the oil flow is minimized, securing sufficient sealing performance. Further, for example, also after the liquid gasket sufficiently cures, the entry of oil into the boundary portion due to the oil flow is minimized, maintaining the sufficient sealing performance. Moreover, because a hermetically sealed state is not formed, an air layer for accelerating the curing of a liquid gasket is not required. Accordingly, for example, disposition of the liquid gasket at the bottom of the case, where oil constantly collects, is also possible. In addition, there is no need to provide a space for forming a hermetically sealed state, and accordingly, a smaller power transmitting device for vehicles is possible, whereby space saving is also achieved.

The object indicated above may be achieved according to a second mode of the invention, which provides (a) a sealing structure using a liquid gasket, having a liquid gasket interposed in the form of a thin film between mating surfaces of a first member and a second member, thereby preventing the movement of oil via the mating surfaces, the sealing structure includes (b) an oil-shielding portion that covers a boundary portion where the liquid gasket and the first member come into contact, thereby preventing an oil flow from directly striking the boundary portion, and is provided on an oil-flow upstream side from the boundary portion.

According to the second mode of the invention, the oil-shielding portion that covers the boundary portion where the liquid gasket and the first member come into contact, thereby preventing the oil flow from directly striking the boundary portion, and is provided on the oil-flow upstream side from the boundary portion. This therefore provides a sealing structure using a liquid gasket, in which without hermetically sealing the boundary portion (interface portion) between the liquid gasket and each member, the entry of oil into the boundary portion due to the oil flow is minimized. Accordingly, for example, when the liquid gasket has not sufficiently cured, the entry of oil into the boundary portion due to the oil flow is minimized, securing sufficient sealing performance. Further, for example, also after the liquid gasket sufficiently has cured, the entry of oil into the boundary portion due to the oil flow is minimized, maintaining the sufficient sealing performance. Moreover, because a hermetically sealed state is not formed, an air layer for accelerating the curing of a liquid gasket is not required. Accordingly, for example, disposition of the liquid gasket at the bottom, where oil constantly collects, is also possible. In addition, there is no need to provide a space for forming a hermetically sealed state, so space saving is also achieved.

Further, the power transmitting device for vehicles may be preferably a transmission consisting of a transmission mechanism itself; a transmission having a torque converter and a transmission mechanism with a plurality of transmission gear ratios; a transaxle having, in addition to a transmission mechanism, a reduction mechanism and/or a differential mechanism; or the like.

The transmission mechanism may be any one of the following examples of transmissions or other transmission. The first examples are various planetary automatic transmissions in which rotational components of two or more sets of planetary gear devices are selectively connected using an engaging device so that a plurality of gear positions (gear ratios) are alternatively achieved, the transmissions each having four forward gear positions, five forward gear positions, six forward gear positions, or a higher gear positions. The second one is a synchromesh, parallel-axis transmission having, between the two shafts, two or more pairs of continuously meshed gears, and a synchronizer alternatively bringing any of the pairs of change gears into a power transmission state. The third one is a synchromesh, parallel-axis automatic transmission, which is the same type of synchromesh, parallel-axis transmission as the second one, and has the gear positions thereof being automatically changeable by a synchronizer that is driven by a hydraulic actuator. The fourth one is an automatic transmission, which is so called a belt-type continuously variable transmission, having a transmitting belt that serves as a power transmitting member, the transmitting belt is wound around a pair of variable pulleys with a variable effective diameter, so the transmission gear ratio thereof is continuously varied. The fifth one is an automatic transmission which is so called a traction-type continuously variable transmission. It has a pair of cones that rotate around a common axis and a plurality of rollers rotatable about rotation centers that cross the axis. The plurality of rollers are pressed between the cones, whereby the crossing angle between each of the rotation center of the rollers and the axis of the cones is changed. As a result, the automatic transmission has a variable transmission gear ratio. The sixth one is an automatic transmission that functions as an electric continuously variable transmission. Such an electric continuously variable transmission has a differential mechanism including, for example, planetary gear sets that distributes power from the engine to a first motor/generator and output shaft, and also has a second motor/generator provided to the output shaft of the differential mechanism. The differential action by the differential mechanism mechanically transmits the main part of the power from the engine to the driving wheel side, and electrically transmits the remaining part of the power from the engine using an electrical path from the first motor to the second motor, whereby the gear ratio of the transmission thereof is electrically changed. The seventh one is an automatic transmission mounted to so-called parallel hybrid vehicles, in which the engine shaft, the output shaft, and the like have a motor provided thereto in a power transmissible manner.

BRIEF DESCRIPTION OF THE DRAWINGS

FIG. 7 is a sectional view of the case of FIG. 4, showing the B-B section of the portion where a rib is not formed. This gives an example different from that of FIG. 5;

DESCRIPTION OF THE PREFERRED EMBODIMENTS

Figure 1:
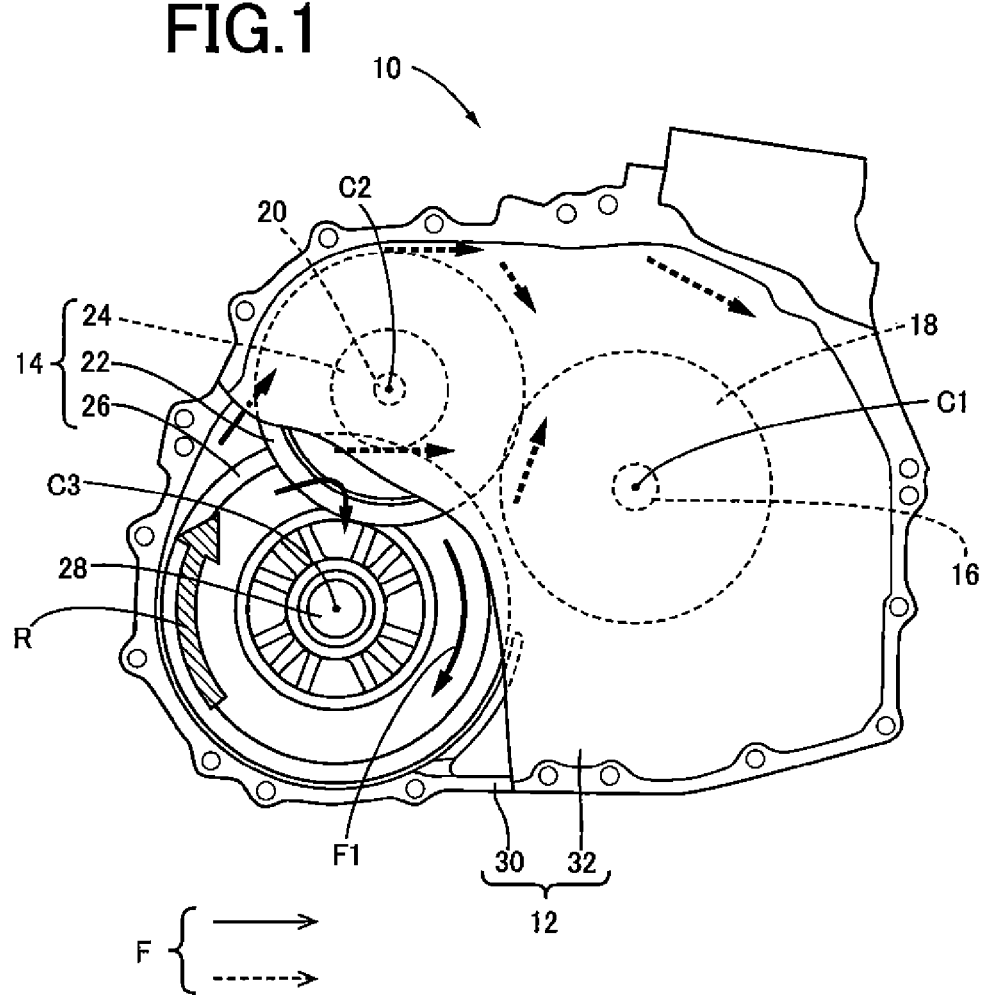
FIG. 1 is a view schematically explaining the structure of a power transmitting device for vehicles, having the sealing structure using a liquid gasket of the invention applied.

Hereafter, embodiments of the present invention are described in detail with reference to the drawings.

First Embodiment

A power transmitting device 10 for vehicles comprises a non-illustrated automatic transmission, a reduction mechanism portion 14, a non-illustrated differential mechanism portion, and the like that are installed in a transaxle case 12 (hereinafter referred to as a case 12) that serves as a nonrotational element attached to the vehicle body, for example. The power transmitting device 10 for vehicles is a transaxle that is suitable for use in FF vehicles, in which the device is mounted in the left-right direction of the vehicle (transversely mounted). The automatic transmission is installed, for example, on a first shaft 16 having a first axis C1, which serves as a main shaft that is connected to a non-illustrated drive power source in a power transmissible manner. The automatic transmission changes the speed of the rotation of the first shaft 16, and outputs it from an output gear 18 installed on the first shaft 16. The output gear 18 functions as a counter drive gear that meshes with a counter driven gear 22 installed on a second shaft 20, having a second axis C2 as a counter shaft, and thereby forms a counter gear pair. The reduction mechanism portion 14 comprises, for example, the counter driven gear 22, a final drive gear 24 that is installed coaxially with the counter driven gear 22 and has a smaller diameter than the counter driven gear 22, and a final driven gears 26 that meshes with the final drive gear 24 to form a final gear pair. The final driven gear 26 functions as, for example, a differential ring gear that forms the differential mechanism portion installed on a third shaft 28, having a third axis C3 as a differential shaft. The third shaft 28 is connected to a pair of non-illustrated driving wheels in a power transmissible manner. The case 12 comprises a case body 30 that serves as a first member and a case cover 32 that serves as a second member. The first and second members are used in combination to receive oil.

In the thus-structured power transmitting device 10 for vehicles, the power of a drive power source, such as an engine or a motor, is transmitted sequentially through the automatic transmission, the reduction mechanism portion 14, the differential mechanism portion, a pair of non-illustrated axles, and the like to the right and left driving wheels. The case 12 receives oil (working oil) in a hermetically sealed state. The oil collecting at the bottom is swept up as a result of the rotation of the final driven gear 26, as a specific gear, in the rotation direction R indicated by the obliquely-hatched arrow R. Accordingly, the oil lubricates the gears, bearings, and other components of the power transmitting device 10 for vehicles. In addition, during the sweeping of oil, due to the rotation of the final driven gear 26 about the third axis C3 in the rotation direction R, a flow F of oil as indicated by arrow F (hereinafter referred to as an oil flow F), for example, is generated in the case 12.

Figure 2:
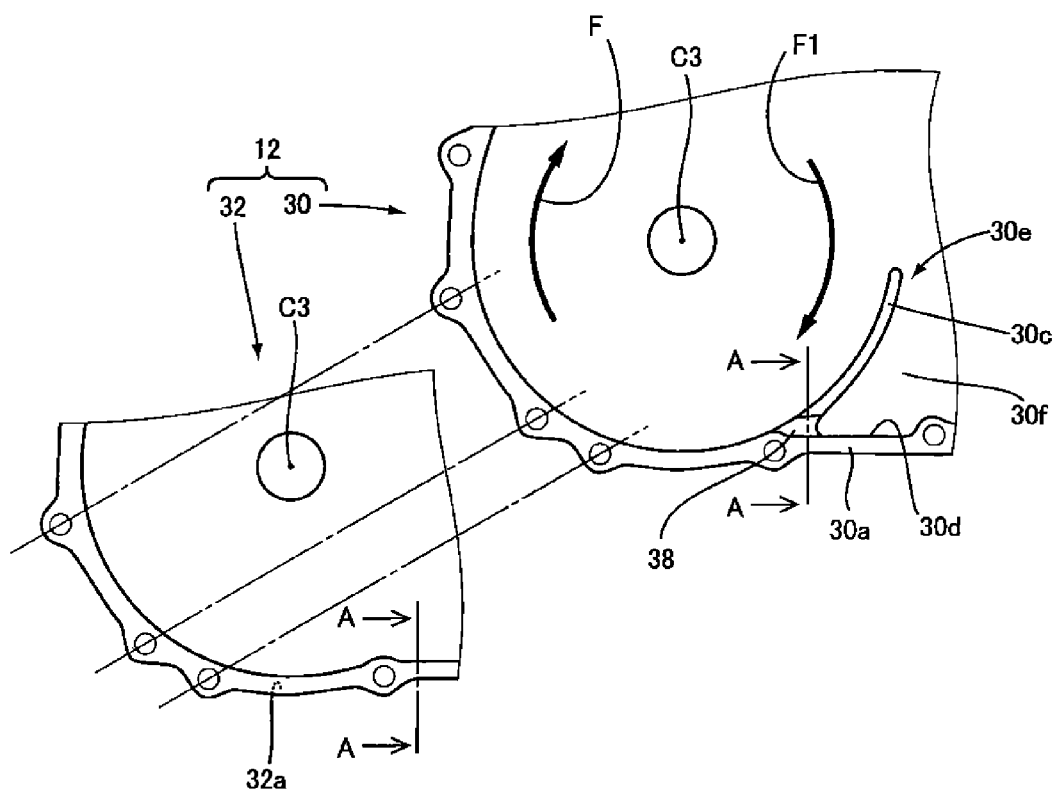
FIG. 2 is an exploded view of a case of the power transmitting device for vehicles of FIG. 1, showing a partially exploded view of the portion where a rib is formed.
Figure 3:
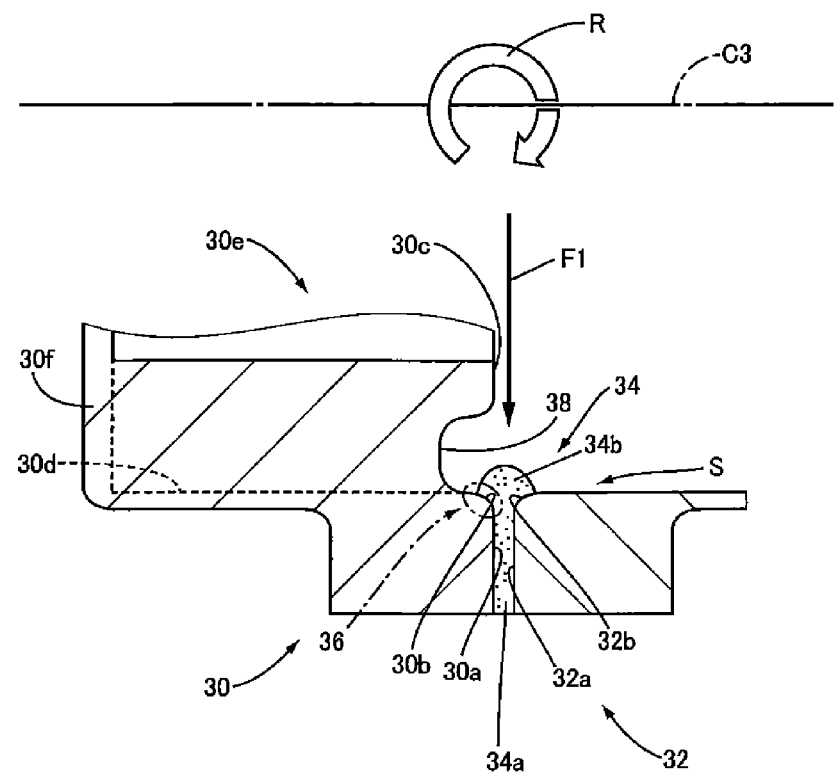
FIG. 3 is a sectional view of the case of FIG. 2, showing the A-A section of the portion where a rib is formed.

In FIGS. 2 and 3, for example, a liquid gasket (for example, FIPG) 34 is applied to each of the mating surfaces (sealed surfaces) 30a and 32a of the case body 30 and the case cover 32, and then, before the liquid gasket 34 has cured, the case body 30 and the case cover 32 are assembled. As a result, the liquid gasket in the form of a thin film, that is, a gasket thin film portion 34a, is interposed between the mating surfaces 30a and 32a. In addition, at the oil-side end portions 30b and 32b (that is, the case 12 inner side) of the mating surfaces 30a and 32a, a gasket lump portion 34b (standing gasket 34b) is formed of the excess of the liquid gasket squeezed out from the mating surfaces 30a and 32a, in such a manner that the gasket lump portion 34b is continuous to the gasket thin film portion 34a. The liquid gasket 34 formed of the gasket thin film portion 34a and the gasket lump portion 34b prevents the movement (leakage) of oil via the mating surfaces 30a and 32b, providing a sealing structure S for preventing oil leakage from the case 12. The liquid gasket 34 of the present embodiment absorbs the moisture in air or the moisture in oil, for example, thus cures, and adheres to the case body 30 and the case cover 32, thereby securing sealing performance (leakage resistance performance) against oil in the case 12. Therefore, in the present embodiment, in addition to the gasket thin film portion 34a, the gasket lump portion 34b is formed to intentionally cause exposure to oil or air. This positively makes contact with air or oil at the gasket lump portion 34b, whereby the curing (adhesion) of the liquid gasket 34 is accelerated, thereby securing sealing performance.

The case body 30 has a rib 30e as a predetermined protruding portion that protrudes to the oil side from the oil-side wall surface 30d (here, the oil side corresponds inside of the case 12) that intersects the mating surface 30a of the case body 30. The rib 30e has a projecting surface 30c. The projecting surface 30c and the mating surface 32a of the case body 30 are arranged in a line parallel to the mating surface 30a. And the projecting surface 30c does not face the mating surface 32a of the case cover 32. For example, the rib 30e stands on the exterior wall portion 30f of the case body 30 in the direction of the third axis C3, and, at the radial outside of, and near, the outer peripheral surface of the final driven gear 26, extends along the circumferential direction of the final driven gear 26. Further, the rib 30e is provided at a portion outside of, and near, the outer peripheral surface of the final driven gear 26, so as to receive an oil flow F1, among the above oil flows F, that is brought back to the bottom of the case 12 by the rotation of the final driven gear 26.

Figure 9A:
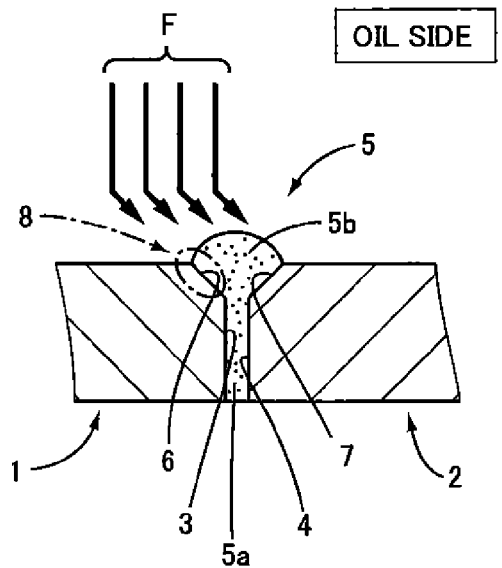
FIGS. 9A and 9B are explanatory views of a conventional example of a sealing structure using a liquid gasket that is interposed between the mating surfaces of a first member and a second member.
Figure 9B:
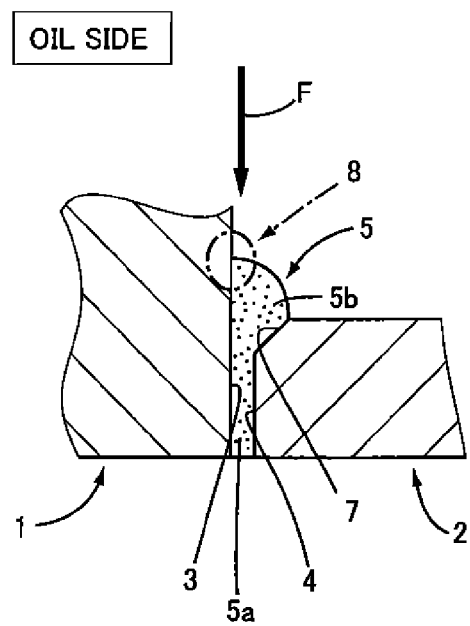

Here, if the mating surface 30a and the protruding surface 30c of the case body 30 form one continuous surface as shown in FIG. 9B, the mating surface 30a has no end portion 30b. In such a case, the interface (adherend) between the liquid gasket 34 (gasket lump portion 34b) and the case body 30 (protruding surface 30c) will be substantially parallel to the above-mentioned oil flow F1, and this possibly increases the likelihood that a strong oil flow F1 directly strikes (that is, directly hits) the interface. That is, the interface is possibly at higher risk for a direct hit by the oil flow F1, and this possibly allows oil to easily enter into the interface, reducing the sealing performance. Further, in the case where the mating surface 30a and the protruding surface 30c form one continuous surface, when the liquid gasket 34 has not sufficiently cured, oil even more easily enters into the interface. As a result, subsequent adhesion of the liquid gasket 34 thereto will be difficult, causing remarkable reduction in sealing performance.

For the reason, in the present embodiment, the oil-shielding portion is provided that covers the interface 36 that is the boundary portion where the gasket lump portion 34a and the case body 30 come into contact, thereby preventing the oil flow F1 from directly striking the interface 36. The oil-shielding portion is provided on the oil-flow-F1 upstream side from the interface 36. Specifically, as shown in FIG. 3, the oil-shielding portion is formed by the end portion 30b of the mating surface 30a being formed, where the gasket lump portion 34b is formed, and also by the slot 38 being formed in the protruding surface 30c at a portion adjoining the mating surface 30a so as to receive a part of the gasket lump portion 34b. Thus, this is to provide a roof-shaped portion for preventing the oil flow F1 from directly hitting the interface 36 on the oil-flow-F1 upstream side of the liquid gasket 34, and as such a roof-shaped portion, the slot 38 for minimizing the entry of oil into the interface 36 is formed in the protruding surface 30c of the case body 30. Further, as a result of the formation of the slot 38 that prevents the mating surface 30a and the protruding surface 30c of the case body 30 from forming one continuous surface, the interface 36 is less likely to be substantially parallel to the oil flow F1. The slot 38 and the end portion 30b can also be regarded as one.

As described above, in the present embodiment, the sealing structure S includes at the oil-side end portions 30b, 32b of the mating surfaces 30a, 32a, the gasket lump portion 34b that is formed of the excess of the thin-film liquid gasket squeezed out from the mating surfaces 30a, 32a, and the oil-shielding portion that covers the interface 36 where the gasket lump portion 34h and the case body 30 come into contact, thereby preventing the oil flow F1 from directly striking the interface 36, and is provided on the oil flow F1 upstream side from the interface 36. This therefore provides a sealing structure S using the liquid gasket 34, in which the gasket lump portion 34b for positively making contact with air or oil is formed so as to accelerate curing, and, without hermetically sealing the interface 36 between the liquid gasket 34 and the case body 30, the entry of oil into the interface 36 due to the oil flow F1 is minimized. Accordingly, for example, when the liquid gasket 34 has not sufficiently cured, the entry of oil into the boundary portion due to the oil flow is minimized, securing sufficient sealing performance. Further, for example, also after the liquid gasket 34 sufficiently cures, the entry of oil into the interface 36 due to the oil flow F1 is minimized, maintaining the sufficient sealing performance. Moreover, because a hermetically sealed state is not formed, an air layer for accelerating the curing of a liquid gasket 34 is not required. Accordingly, for example, disposition of the liquid gasket 34 at the bottom, where oil constantly collects, is also possible. Consequently, the sealing structure S according to the present embodiment is applicable to the bottom of the case 12. In addition, since there is no need to provide a space for forming a hermetically sealed state, space saving is also achieved.

Preferably, the case body 30 has the projecting surface 30c having the protruding surface that extends in the direction parallel to the mating surface 30a of the case body 30 and does not faces the mating surface 32a of the case cover 32, and protruding toward the oil side from the wall surface 30d that intersects the mating surface 30a of the case body 30, and the oil-shielding portion is formed by a slot 38 being formed in the projecting surface 30c at a portion adjoining the mating surface 30a of the case body 30, so that the slot 38 receives a part of the gasket lump portion 34b. As a result, with respect to the oil-shielding portion that covers the interface 36 where the gasket lump portion 34b and the case body 30 come into contact, thereby preventing the oil flow F1 from directly striking the interface 36, such an oil-shielding portion is appropriately provided on the oil flow F1 upstream side from the interface 36. Specifically, a slot 38 that prevents the mating surface 30a and the projecting surface 30c of the case body 30 from having one continuous surface is formed, and a part of the gasket lump portion 34b is received in the slot 38. This makes it less likely that the interface 36 between the gasket lump portion 34b and the case body 30 will be substantially parallel to the oil flow F1. Accordingly, for example, a strong oil flow F is less likely to directly hit the interface 36, whereby the entry of oil into the interface 36 due to the oil flow F1 is minimized.

Further, in the present embodiment, the case body 30 and the case cover 32 form the case 12 of the power transmitting device 10 for vehicles, while the oil flow F1 is an oil flow F in the case 12 generated by the rotation of a specific gear (final driven gear 26) placed in the case 12 forming the power transmitting device 10 for vehicles. As a result, in the case 12 of the power transmitting device 10 for vehicles, the gasket lump portion 34b for positively making contact with oil or air is formed, whereby the curing is accelerated. At the same time, without hermetically sealing around the interface 36 between the liquid gasket 34 and the case body 30, the entry of oil into the interface 36 due to the oil flow F1 in the case 12 generated by the rotation of the final driven gear 26 is minimized. Accordingly, for example, when the liquid gasket 34 has not sufficiently cured in a completion test of the power transmitting device 10, the entry of oil into the interface 36 due to the oil flow F1 is minimized, securing sufficient sealing performance. In addition, there is no need to provide a space for forming a hermetically sealed state, and accordingly, then a smaller power transmitting device 10 for vehicles can be achieved, whereby space saving is also achieved.

Hereinafter, other embodiments of the present invention are described. In the following explanation, the portions common between the embodiments are indicated by the same numerals, and explanations thereof are omitted.

Second Embodiment

In the above embodiment, a slot 38 was formed at the portion where the rib 30e is formed in the case body 30. The slot 38 prevents the mating surface 30a and the protruding surface 30c of the case body 30 from forming one continuous surface, so that the interface between the gasket lump portion 34b and the protruding surface 30c is not substantially parallel to the oil flow F1, and a strong oil flow F1 does not directly hit the interface. Incidentally, as shown in FIG. 9A, for example, also at a portion where the rib 30e is not formed, there is a possibility that the entry of oil due to the oil flow F into the interface between the gasket lump portion 34b and each member (the case body 30 and the case cover 32) may not be sufficiently eliminated. The present embodiment thus proposes an oil-shielding portion for a case where rib 30e is not formed.

Figure 4:
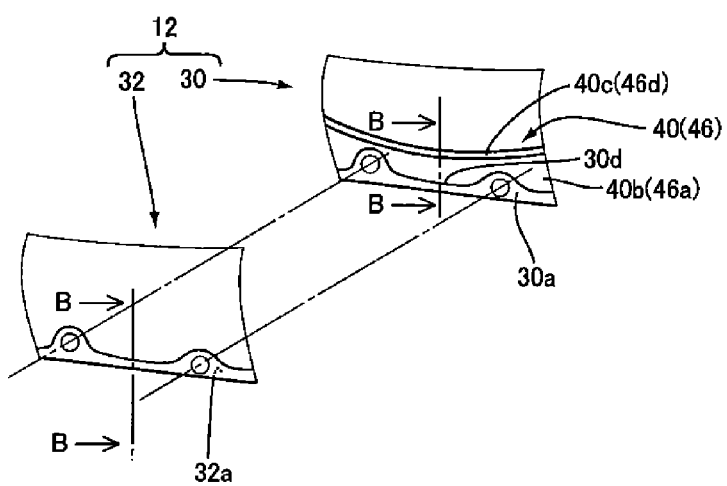
FIG. 4 is an exploded view of a case of the power transmitting device for vehicles of FIG. 1, showing a partially exploded view of the portion where a rib is not formed.
Figure 5:
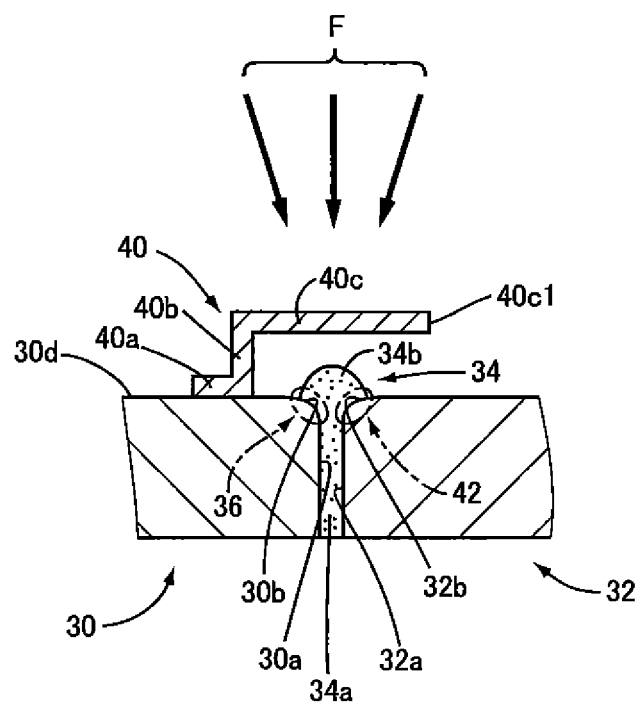
FIG. 5 is a sectional view of the case of FIG. 4, showing the B-B section of the portion where a rib is not formed.

In FIGS. 4 and 5, the oil-shielding portion of the present embodiment is a first direct-hit-avoiding plate 40 having a roof-like shape to cover the gasket lump portion 34b. The first direct-hit-avoiding plate 40 stands in the vicinity of the oil-side end portion 30b of the mating surface 30a of the case body 30, and is fixed to a wall surface 30d of the case body 30, which intersects the mating surface 30a. Specifically, the first direct-hit-avoiding plate 40 has an elongated, arc-shaped base plate 40a that is fixed along the wall surface 30d; a standing plate 40b provided to extend perpendicularly a predetermined length toward inside of the case 12 from a side of the base plate 40a on the case cover 32 side; and a roof plate 40c provided to perpendicularly extend a predetermined length toward the case cover 32 from a side of the standing plate 40b on a side corresponding to inside of the case 12. An end portion 40c1 of the roof plate 40c prevents the oil flow F from directly hitting, for example, the interface 42 as the boundary portion where the gasket lump portion 34b and the case cover 32 come into contact in addition to preventing the oil flow F directly hitting the interface 36. For this purpose, the end portion 40c1 of the roof plate 40c extends toward inside of the case cover 32, so that the roof plate 40c is located on the oil-flow-F upstream side from the interface 42 to cover the interface 42. Thus, this embodiment is to provide a roof-shaped portion for preventing the oil flow F from directly hitting the interfaces 36 and 42 on the oil-flow-F upstream side of the liquid gasket 34. Specifically as such a roof-shaped portion, the first direct-hit-avoiding plate 40 covering the gasket lump portion 34b is provided. At a portion where no rib 30e is formed in the case 12, the first direct-hit-avoiding plate 40 does not necessarily have to be provided in the places where no oil flow F is present or where an oil flow F, whose strength is highly unlikely to reduce the sealing performance is present. In other words, the first direct-hit-avoiding plate 40 may be provided according to the oil flow F.

Figure 6A:
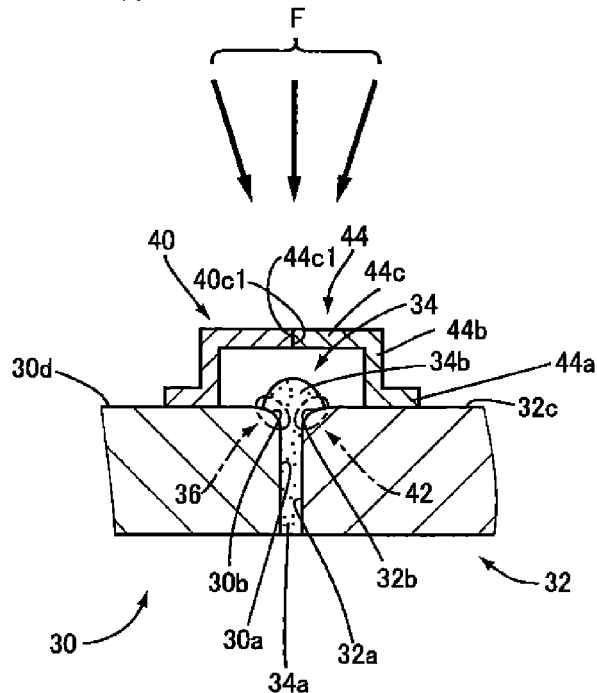
FIGS. 6A and 6B are sectional views of the case of FIG. 4, showing the B-B section of the portion where a rib is not formed. This gives an example different from that of FIG. 5.
Figure 6B:
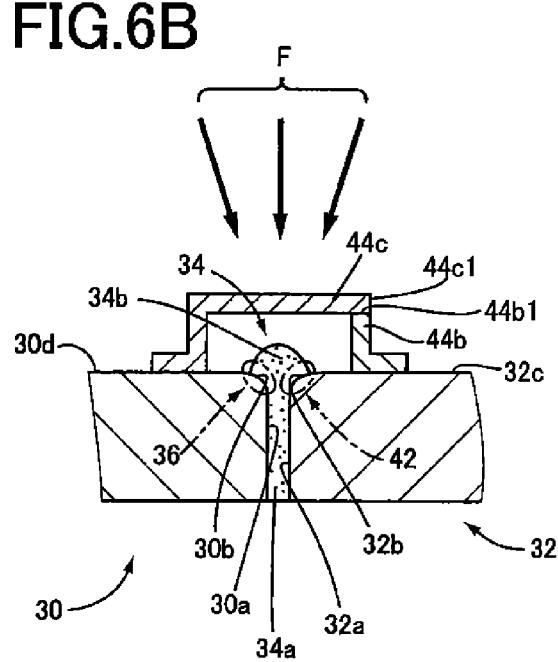

FIGS. 6A and 6B show other embodiment which differs from that of FIG. 5. In FIG. 6A, the oil-shielding portion of the present embodiment further has, in addition to the first direct-hit-avoiding plate 40, a second direct-hit-avoiding plate 44 having a roof-like shape to cover the gasket lump portion 34b. The second direct-hit-avoiding plate 44 stands in the vicinity of the oil-side end portion 32b of the mating surface 32a of the case cover 32, and is fixed to the oil-side wall surface 32c (here, the oil-side corresponds inside of the case 12) of the case cover 32, which intersects the mating surface 32a. Specifically, the second direct-hit-avoiding plate 44 has an elongated, arc-shaped base plate 44a fixed along the wall surface 32c; a standing plate 44b provided to extend perpendicularly a predetermined length toward inside of the case 12 from a side of the base plate 44a on the case body 30 side; and a roof plate 44c provided to perpendicularly extend a predetermined length toward the case body 30 from a side of the standing plate 44b corresponding to inside of the case 12. Further, as shown in FIG. 6A, the second direct-hit-avoiding plate 44 is disposed in such a manner that the facing end portions of the first direct-hit-avoiding plate 40 and the second direct-hit-avoiding plate 44 are in contact with each other, that is, the end portion 40c1 of the roof plate 40c and the end portion 44c1 of the roof plate 44c are in contact with each other. Thus, this embodiment is to provide roof-shaped portions for preventing the oil flow F1 from directly hitting the interfaces 36 and 42 on the oil-flow-F1 upstream side of the liquid gasket 34, and as such roof-shaped portions, both the case body 30 and the case cover 32 are provided with the first and second direct-hit-avoiding plates 40 and 44, respectively, covering the gasket lump portion 34b. Seemingly, the first and second direct-hit-avoiding plates 40 and 44 put the liquid gasket 34 (gasket lump portion 34b) into a hermetically sealed state, which will retard the curing of the liquid gasket 34. However, as in the above embodiment where only the first direct-hit-avoiding plate 40 is provided, the first and second direct-hit-avoiding plates 40 and 44 are not necessarily provided to all portions where no rib 30e is formed in the case 12. Therefore, since the gasket lump portion 34b is sufficiently exposed to oil or air, the curing of the liquid gasket 34 is sufficiently accelerated.

The first and second direct-hit-avoiding plates 40 and 44 do not have to have the roof plates 40c and 44c, respectively. It is also possible that either of the first and second direct-hit-avoiding plates 40 and 44 has the roof plate 40c or 44c. For example, as shown in FIG. 6B, in the case where the end portion 40c1 of the roof plate 40c extends so that an end portion 44b1 of the standing plate 44b contacts the roof plate 40c, the second direct-hit-avoiding plate 44 is not required to have a roof plate 44c.

As above, in the present embodiment, the oil-shielding portion is the first direct-hit-avoiding plate 40 having a roof-like shape to cover the gasket lump portion 34b. The first direct-hit-avoiding plate 40 stands in the vicinity of the oil-side end portion 30b of the mating surface 30a of the case body 30, and is fixed to the wall surface 30d of the case body 30, which intersects the mating surface 30a. As a result, with respect to the oil-shielding portion that covers the interface 36 where the gasket lump portion 34b and the case body 30 come into contact, thereby preventing the oil flow F from directly striking the interface 36, such an oil-shielding portion is appropriately provided on the oil-flow-F upstream side from the interface 36.

Further, in the present embodiment, the oil-shielding portion has, in addition to the first direct-hit-avoiding plate 40, the second direct-hit-avoiding plate 44 having a roof-like shape to cover the gasket lump portion 34b. The second direct-hit-avoiding plate 44 stands in the vicinity of the oil-side end portion 32b of the mating surface 32a of the case cover 32, and is fixed to the wall surface 32c of the case cover 32, which intersects the mating surface 32a. The first direct-hit-avoiding plate 40 and the second direct-hit-avoiding plate 44 are disposed in such a manner that their mutually facing end portions are in contact with each other. As a result, with respect to the oil-shielding portion that covers the interface 36, thereby preventing the oil flow F from directly striking the interface 36, also covers the interface 42, thereby preventing the oil flow F from directly striking the interface 42, such an oil-shielding portion is appropriately provided on the oil-flow-F upstream side from the interface 42. In addition, as mentioned above, the first direct-hit-avoiding plate 40 can also function singly as an oil-shielding portion that prevents the oil flow F directly striking the interface 36, as well as the oil flow F directly striking the interface 42.

Third Embodiment

The present embodiment further proposes other oil-shielding portion that corresponds to a portion where no rib 30e is formed, which is different from the second embodiment.

FIG. 7 shows other embodiment which differs from that of FIG. 5. In FIG. 7, the oil-shielding portion of the present embodiment corresponds a first protruding portion 46 having a roof-like shape to cover the gasket lump portion 34b. The first protruding portion 46 is formed on the wall surface 30d of the case body 30, which intersects the mating surface 30a of the case body 30. Specifically, the first protruding portion 46 is provided at a location other than in the vicinity of the gasket lump portion 34b, and has a protruding wall portion 46a and a plate-like roof portion 46b. The protruding wall portion 46a is formed to have predetermined thickness to extend toward the inside of the case 12 in the direction perpendicular to the wall surface 30d, and the roof portion 46b is formed to perpendicularly extend a predetermined length toward the case cover 32 from the end portion of the protruding wall portion 46a in a direction to inside of the case 12. The end portion 46b1 of the roof portion 46b prevents, the oil flow F from directly hitting, for example, the interface 42 in addition to preventing the oil flow F from directly hitting the interface 36. For this purpose, the roof portion 46b extends (overhangs) toward the inside of the case cover 32 in such a manner that the roof portion 46b is located on the oil-flow-F upstream side from the interface 42 to cover the interface 42. Thus, this embodiment is to provide a roof-shaped portion for preventing the oil flow F from directly hitting the interfaces 36 and 42 on the oil-flow-F upstream side of the liquid gasket 34. Specifically as such a roof-shaped portion, the first protruding portion 46 that covers the gasket lump portion 34b is provided. At a portion where no rib 30e is formed in the case 12, the first protruding portion 46 does not necessarily have to be provided in the places where no oil flow F is present whose strength is highly unlikely to reduce the sealing performance or where an oil flow F is present. In other words, the first protruding portion 46 may be provided depending on the oil flow F.

Figure 8A:
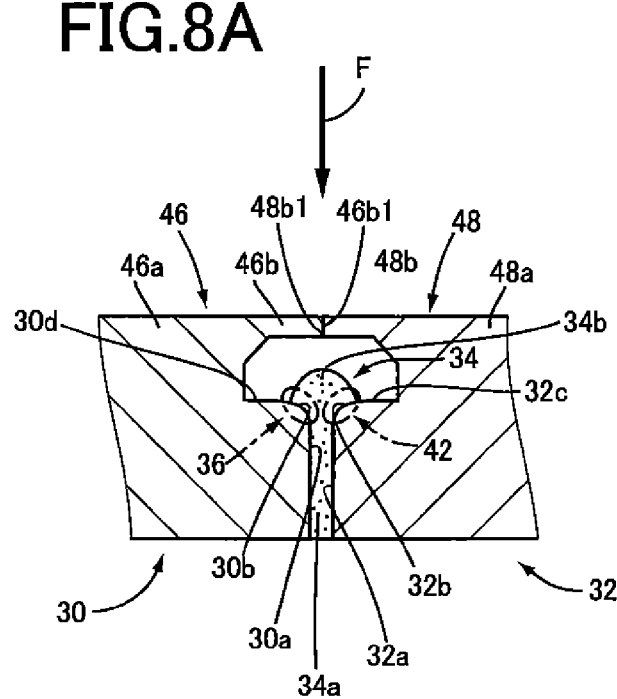
FIGS. 8A and 8B are sectional views of the case of FIG. 4, showing the B-B section of the portion where a rib is not formed. This gives an example different from that of FIG. 7.
Figure 8B:
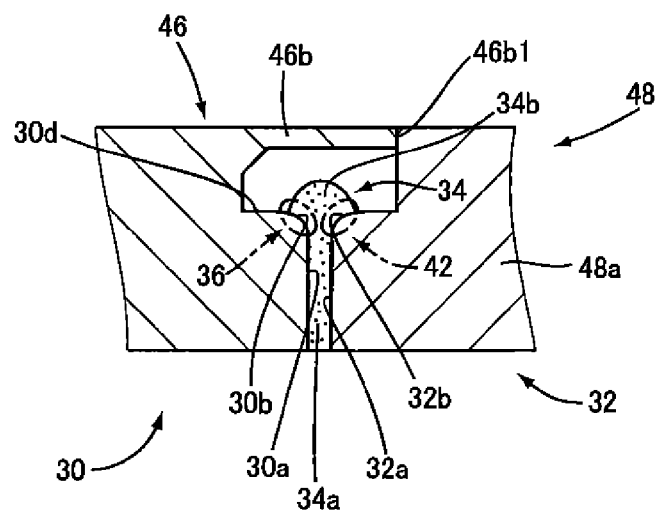

FIGS. 8A and 8B show other embodiments which differ from that of FIG. 7. In FIG. 8A, the oil-shielding portion of the present embodiment has, in addition to the first protruding portion 46, a second protruding portion 48 having a roof-like shape to cover the gasket lump portion 34b. The second protruding portion 48 is formed on the wall surface 32c of the case cover 32, which intersects the mating surface 32a of the case cover 32. Specifically, the second protruding portion 48 is provided at a location other than in the vicinity of the gasket lump portion 34b, and has a protruding wall portion 48a and a plate-like roof portion 48b. The protruding wall portion 48a is formed to have predetermined thickness to extend toward the inside of the case 12 in the direction perpendicular to the wall surface 32c, and the roof portion 48b is formed to perpendicularly extend a predetermined length toward the case body 30 from the end portion of the protruding wall portion 48a in a direction to inside of the case 12. Further, as shown in FIG. 8A, the first protruding portion 46 and the second protruding portion 48 are formed in such a manner that the mutually facing end portions of the first protruding portion 46 and the second protruding portion 48 are in contact with each other, that is, the end portion 46b1 of the roof portion 46b and the end portion 48b1 of the roof portion 48b are in contact with each other. Thus, this embodiment is to provide roof-shaped portions for preventing the oil flow F from directly hitting the interfaces 36 and 42 on the oil-flow-F upstream side of the liquid gasket 34. Specifically as such roof-shaped portions, the case body 30 and the case cover 32 are provided with the first and second protruding portions 46 and 48, respectively, covering the gasket lump portion 34b. Seemingly, the first and second protruding portions 46 and 48 put the liquid gasket 34 (gasket lump portion 34b) into a hermetically sealed state, which will retard the curing of the liquid gasket 34. However, as in the above embodiment where only the first protruding portion 46 is provided, the first and second protruding portions 46 and 48 are not necessarily provided to all portions where no rib 30e is formed in the case 12. Therefore, since the gasket lump portion 34b is sufficiently exposed to oil or air, the curing of the liquid gasket 34 is sufficiently accelerated.

In addition, the first and second protruding portions 46 and 48 do not have to have the roof portions 46b and 48b, respectively. It is also possible that either of the first and second protruding portions 46 and 48 has the roof portion 46b or 48b. For example, as shown in FIG. 8B, in the case where the end portion 46b1 of the roof portion 46b extends so that the end portion 46b1 contacts the protruding wall portion 48a at the end portion thereof on the case 12 inside side, the second protruding portion 48 is not required to have a roof portion 48b.

As above, in the present embodiment, the oil-shielding portion is the first protruding portion 46 having a roof-like shape to cover the gasket lump portion 34b. The first protruding portion 46 is formed on the wall surface 30d of the case body 30, which intersects the mating surface 30a of the case body 30. As a result, with respect to the oil-shielding portion that covers the interface 36 where the gasket lump portion 34b and the case body 30 come into contact, thereby preventing the oil flow F from directly striking the interface 36, such an oil-shielding portion is appropriately provided on the oil-flow-F upstream side from the interface 36.

Further, in the present embodiment, the oil-shielding portion has, in addition to the first protruding portion 46, the second protruding portion 48 having a roof-like shape to cover the gasket lump portion 34b. The second protruding portion 48 is formed on the wall surface 32c of the case cover 32, which intersects the mating surface 32a of the case cover 32. The first protruding portion 46 and the second protruding portion 48 are formed in such a manner that their mutually facing end portions are in contact with each other. As a result, with respect to the oil-shielding portion that covers the interface 36, thereby preventing the oil flow F from directly striking the interface 36, and also covers the interface 42, thereby preventing the oil flow F from directly striking the interface 42, such an oil-shielding portion is appropriately provided on the oil-flow-F upstream side from the interface 42. In addition, as mentioned above, the first protruding portion 46 can also function singly as an oil-shielding portion that prevents the oil flow F from directly striking the interface 36, as well as the oil flow F from directly striking the interface 42.

The above explains the embodiments of the invention in detail based on the drawings; however, the present invention is also applicable to other embodiments.

For example, the above embodiments explained the instances where the sealing structure S using a liquid gasket of the invention is applied to a power transmitting device 10 for vehicles. However, the present invention is applicable not only to the power transmitting device 10 for vehicles, but also to various devices, portions, or the like having, for example, a case that puts oil into a hermetically sealed state using a first member and a second member, a case for preventing the entry of oil using a first member and a second member, a member that uses a first member and a second member to prevent the movement of oil via the mating surfaces thereof, or the like. An example thereof is a power transmitting device for vehicles, which has a torque converter and/or an automatic transmission installed in a transmission case suitable for use in known FR type vehicles. Further, although the above-mentioned oil flow is an oil flow F generated when the oil is swept up by the rotation of the final driven gear 26, it may be an oil flow generated by the rotation of other gears. The oil flow may also be one that is generated at the time when a case is disposed into an existing flow of oil for preventing the entry of such oil.

Further, the above embodiments described an embodiment having, as an oil-shielding portion, the first direct-hit-avoiding plate 40 and the second direct-hit-avoiding plate 44; an embodiment having, as an oil-shielding portion, the first protruding portion 46 and the second protruding portion 48; or the like. However, in addition to these, various embodiments are possible, such as one having a first direct-hit-avoiding plate 40 and a second protruding portion 48. For example, in addition to the slot 38 formed on the case body 30 side for preventing the mating surface 30a and the protruding surface 30c from forming one continuous surface, a second direct-hit-avoiding plate 44 or a second protruding portion 48 may be provided on the case cover 32 side.

Further, in the above embodiments, in the case where an oil-shielding portion is provided to each of the case body 30 side and the case cover 32 side, the two oil-shielding portions are brought into contact with each other to seemingly put the liquid gasket 34 (gasket lump portion 34b) into a hermetically sealed state. However, as long as a direct hit by the oil flow F is prevented, they do not necessarily have to be in contact with each other.

Further, although the liquid gasket 34 comprises the gasket thin film portion 34a and the gasket lump portion 34b in the above embodiments, these portions 34a and 34b do not necessarily have to be construed to be separated.

The above-mentioned embodiments can be implemented in combination with one another according to established priorities, for example.

The above are just some embodiments of the present invention, and various modifications and improvements are possible based on the knowledge of those skilled in the art.

What is claimed is:

1. A sealing structure using a liquid gasket, having the liquid gasket interposed in the form of a thin film between mating surfaces of a first member and a second member, thereby preventing the movement of oil via the mating surfaces, the sealing structure comprising:

a gasket lump portion that is formed of an excess of the thin-film liquid gasket squeezed out from the mating surfaces at oil-side end portions of the mating surfaces; and an oil-shielding portion that covers a boundary portion where the gasket lump portion and the first member come into contact, thereby preventing a flow of the oil from directly striking the boundary portion, and is provided on an oil-flow upstream side from the boundary portion, wherein the first member has a predetermined protrusion having a protruding surface that extends in a direction parallel to the mating surface of the first member and does not face the mating surface of the second member, and protruding toward the oil side from a wall surface that intersects the mating surface of the first member, and wherein the oil-shielding portion is formed by a slot being formed in the protruding surface at a portion adjoining the mating surface of the first member, so that the slot receives a part of the gasket lump portion and the flow of the oil directly strikes other part of the gasket lump portion than the part of the gasket lump portion.

2. A sealing structure using a liquid gasket, having the liquid gasket interposed in the form of a thin film between mating surfaces of a first member and a second member, thereby preventing the movement of oil via the mating surfaces, the sealing structure comprising:

a gasket lump portion that is formed of an excess of the thin-film liquid gasket squeezed out from the mating surfaces at oil-side end portions of the mating surfaces, wherein the first member has a predetermined protrusion having a protruding surface that extends in a direction parallel to the mating surface of the first member and does not face the mating surface of the second member, and protruding toward the oil side from a wall surface that intersects the mating surface of the first member, wherein a slot is formed in the protruding surface at a portion adjoining the mating surface of the first member, so that the slot receives a part of the gasket lump portion, and wherein the gasket lump portion is not in contact with a portion being formed in the slot and adjoining the protruding surface.

* * * * *